United States Patent [19]

Kim et al.

[11] Patent Number: 5,502,489
[45] Date of Patent: Mar. 26, 1996

[54] METHOD FOR THE MOTION ADAPTIVE SPATIAL FILTERING OF VIDEO SIGNALS IN AN IMAGE CODING APPARATUS

[75] Inventors: Jong-Hun Kim, Seoul; Seong-Dae Kim, Daejeon, both of Rep. of Korea

[73] Assignee: Daewoo Electronics Co., Ltd., Seoul, Rep. of Korea

[21] Appl. No.: 176,794

[22] Filed: Jan. 3, 1994

[51] Int. Cl.$^6$ .................. H04N 7/18; H04N 7/12
[52] U.S. Cl. .................. 348/607; 348/606; 348/620
[58] Field of Search .................. 348/701, 666, 348/606, 607, 618, 619, 620; 364/724.1; 358/458, 463; 382/54; 340/855.7; H04N 7/18, 7/12

[56] References Cited

U.S. PATENT DOCUMENTS

| | | | |
|---|---|---|---|
| 4,694,342 | 9/1987 | Klees | 348/619 |
| 4,860,104 | 8/1989 | Katsuyama | 348/701 |
| 4,890,160 | 12/1989 | Thomas | 348/699 |
| 4,896,152 | 1/1990 | Tiemann | 340/855.7 |
| 5,107,348 | 4/1992 | Citta et al. | 348/384 |
| 5,166,788 | 11/1992 | Lee | 348/701 |
| 5,191,419 | 3/1993 | Wischermann | 348/701 |
| 5,245,433 | 9/1993 | Sid-Ahmed et al. | 348/606 |
| 5,253,059 | 10/1993 | Ansari et al. | 348/390 |
| 5,311,310 | 5/1994 | Jozawa et al. | 348/607 |
| 5,327,242 | 7/1994 | Naimpally et al. | 348/606 |
| 5,329,317 | 7/1994 | Naimpally et al. | 348/620 |
| 5,333,054 | 7/1994 | Tanaka et al. | 348/666 |
| 5,343,247 | 8/1994 | Vogel | 348/607 |

OTHER PUBLICATIONS

Eric Dubois et al., Noise Reduction in Image Sequences Using Motion-Compensated Temporal Filtering, IEEE Transactions on Communications, COM-32, No. 7(Jul., 1984).

Wen-Hsiung Chen et al., Recursive Temporal Filtering and Frame Rate Reduction for Image Coding, IEEE Journal on Selected Areas in communications, SAC-5, (Aug., 1987).

R. A. F. Belfor, et al., Motion Compensated Subsampling of HDTV, SPIE, Visual Communications and Image Processing '91, 1605.

Chan and Pratt, Scene Adaptive Coder, IEEE transactions on Communications, vol., COM-32, No. 3(Mar. 1984).

Jae S. Lim, Two-Dimensional Signal and Image Processing, Prentice-Hall, International Edition, pp. 497-500(1990).

Primary Examiner—Tommy P. Chin
Assistant Examiner—Vu Le
Attorney, Agent, or Firm—William F. Pinsak

[57] ABSTRACT

The present invention is a motion adaptive spatial filtering-(MASF) method for use with a image coding apparatus, which proceeds the temporal band-limitation of the video frame signals on spatial domain along the trajectory of a moving component without temporal aliasing by using a filter having a band-limitation characteristic according to a cutoff frequency. It is well known that video signal may contain a lot of temporal aliasing components because of insufficient frame sampling rate. And it is impossible to design band-limiting temporal filter simply by convolving a sequence of frames along the temporal direction. From a signal processing point of view, the aliasing degrades filter characteristics. This filtering method takes advantage of the fact that, if motion of each pixel is known, the temporal filtering can be performed in the spatial domain filtering along its trajectory. That results in de-aliasing characteristic.

5 Claims, 6 Drawing Sheets

BASE-BAND SPECTRUM DISTRIBUTIONS OF MOVING OBJECT

CONVENTIONAL LOWPASS FILTERING

RECTANGULAR IMAGE SAMPLING PATERN
(VIDEO FRAME SIGNAL)

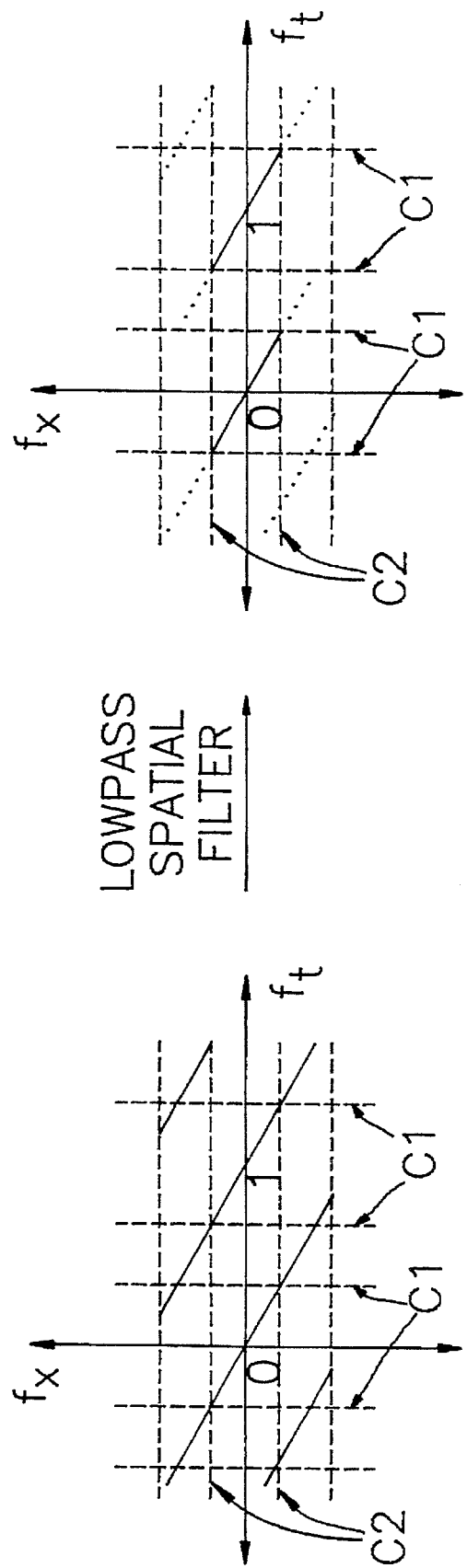
FIG. 6 MOTION ADAPTIVE SPATIAL FILTERING

METHOD FOR THE MOTION ADAPTIVE SPATIAL FILTERING OF VIDEO SIGNALS IN AN IMAGE CODING APPARATUS

FIELD OF THE INVENTION

The present invention is directed to a method for the temporal filtering of video signals; and, in particular, to a motion adaptive spatial filtering(MASF) method for use in an image coding apparatus, which performs a temporal filtering or averaging operation in the spatial domain along the trajectory of a moving object to achieve a temporal band limitation without incurring an temporal aliasing effect and obtain an improved picture quality.

DESCRIPTION OF THE PRIOR ART

In digital television systems such as videotelephone, teleconferencing and high definition television ("HDTV") equipment, an image coding apparatus has been used to reduce a large volume of data defining each frame of video signals by way of employing various data compression techniques, for example, transform coding using Discrete Cosine Transform, and motion compensation coding based on the temporal relationship between two successive frames.

In order to effectively carry out the data compression process, most real-time image coding apparatus available in the art employ various filters. These filters serves to eliminate or alleviate temporal noises and perform band limitation to thereby improve the picture quality and coding rates.

One of such prior art apparatus is disclosed in an article by Eric Dubois et al., "Noise Reduction in Image Sequences Using Motion-Compensated Temporal Filtering", *IEEE Transactions on Communications, COM*-32, No. 7 (July, 1984), which utilizes a nonlinear recursive temporal filter to reduce to noise components which may arise in the initial signal generation and handling operation. This temporal filter employs a motion compensation technique to perform the filtering in the temporal domain along the trajectory of a motion and reduce noise components in moving areas without modifying the details of an image.

Another prior art apparatus is described in an article by Wen-Hsiung Chen et al., "Recursive Temporal Filtering and Frame Rate Reduction for Image Coding", *IEEE Journal on Selected Areas in Communications, SAC*-9 (August, 1987), which also employs a recursive temporal filter to perform a recursive filtering and frame rate reduction. This filter when applied in the temporal domain can smooth out frame-to-frame input noises and improve the picture quality.

U.S. Pat. No. 4,694,342 issued to K. J. Klees provides another apparatus which utilizes a spatial filter that can function both recursively and non-recursively for removing noises from a video image while substantially preserving the details thereof. This filter includes a lookup table storing predefined and filtered output pel values and predefined feedback pel values wherein certain portions of the incoming image are filtered non-recursively to substantially preserve the image details while certain other portions of the image are filtered recursively to remove noises therefrom.

While the above and other prior art apparatus are capable of reducing the noise in moving areas without altering the image details through the use of a lowpass filtering technique performed along the motion trajectory, such prior art approaches may introduce artifacts in those areas where the motion occurs in a relatively high speed. As a result, such apparatus are not equipped to adequately deal with the temporal band limitation or the visual artifacts resulting from a temporal aliasing between video frame signals.

U.S. Pat. No. 4,896,152 issued to J. J. Tiemann offers another prior art apparatus which employs an infinite impulse response (IIR) filter to limit the bandwidth of the signal preparatory to subsampling and avoid the aliasing effect substantially. This filter also includes a finite impulse response (FIR) filter to compensate attendant phase distortion.

Unfortunately, however, this filter cannot track a motion and may also introduce artifacts in the areas where the motion is in a relatively high speed. More specifically, this filter may permit the filter response to be subsampled at a region far from the Nyquest limit due to the temporal aliasing occurring between subsequent spectra. This tends to decrease the temporal cut-off frequency of the filter so as to reduce the artifacts, which may affect the picture quality due to the sacrifice of a substantial part of the image.

On the other words, if the subsequent spectra include the aliasing components, visual artifacts appear in the image. Especially, those moving areas comprised of spatial high frequency components may distort psychovisual effects: this is, the perceived velocity on moving areas may differ from the actual velocity. For an efficient temporal band-limitation, therefore, it is desirable to design a temporal filter which is not affected by the aliasing.

Further, in order to carry out a temporal domain filtering with pixels located along a temporal axis and limit the temporal bandwidth, a great deal of frame delay and memory are required, which may become an obstacle in implementing an image coding apparatus.

SUMMARY OF THE INVENTION

It is, therefore, an object of the present invention to provide a motion adaptive spatial filtering method for use in an image coding apparatus, capable of effectively performing a temporal band limitation of video signals without incurring temporal aliasing and thereby improving the picture quality.

In accordance with the present invention, There is provided an image coding apparatus comprising a filter for lowpass filtering video frame signals and an encoder for eliminating redundancy in the filtered video frame signals in order to compress the video frame signals to a more manageable size for transmission, wherein the video signal has one or more moving objects in high speeds. This filter carries out method for filtering video frame signals with a predetermined temporal cutoff frequency to achieve a temporal band limitation in the image coding apparatus, which comprises the steps of: (a) determining a motion vector which represents the movement of an object between a video frame signal and its previous video frame signal; and (b) performing a filtering operation of the video frame signal in the spatial domain with a spatial cutoff frequency which changes adaptively with the motion vectors in order to achieve the temporal band limitation.

BRIEF DESCRIPTION OF THE DRAWINGS

The above and other objects and features of the instant invention will become apparent from the following description of preferred embodiments taken in conjunction with the accompanying drawings, in which:

FIG. 6 is a diagram describing the result of the motion adaptive spatial filtering performed in accordance with the present invention, in comparison with the conventional filtering shown in FIG. 2.

DETAILED DESCRIPTION OF THE PREFERRED EMBODIMENTS

A video signal may be treated in terms of its 3-dimensional (3-D), i.e., horizontal, vertical and temporal components; and described as a continuous function $f_3(x,y,t)$. Assuming that its moving objects have only a constant-velocity rigid translational motion $V=(v_x, v_y)$ the Fourier transform of the continuous video signal, $F_3(\cdot)$, may be represented as follows:

$$F_3(f_x, f_y, f_t) = F_2((f_x, f_y) \cdot \delta(f_x v_x + f_y v_y + f_t) \quad (1)$$

wherein $F_2(f_x, f_y)$ is the Fourier transform of a 2-dimensional video signal $f_2(x,y)$, and $\delta(f_x v_x + f_y v_y + f_t)$ represents a tilted plane in a 3-dimensional frequency space defined by the equation, $$f_x v_x + f_y v_y + f_t = 0,$$

so that the baseband exists only on a 2-dimensional frequency plane. This equation(1) has been discussed in, e.g., articles by R. A. F. Belfor, et al., "Motion Compensated Subsampling of HDTV", *SPIE, Visual Communications and Image Processing* '91, 1605. From the location of a baseband spectrum, a spatio-temporal bandwidth can be anticipated. This is, if a temporal bandwidth $f_w{}^t$ is given, a relationship among the temporal bandwidth $f_w{}^t$, the spatial bandwidth $f_w{}^x$ and $f_w{}^y$, and the velocity components $v_x$ and $v_y$, is obtained from Eq. (1) as follows:

$$f_w{}^t = f_w{}^x \cdot v_x + f_w{}^y \cdot v_y \quad (2)$$

wherein $f_w{}^x$ and $f_w{}^y$ are the respective spatial bandwidth components in x and y directions. From Eq. (2), it can be seen that the temporal bandwidth is proportional to the velocity of the moving objects; and when the temporal bandwidth is fixed, the spatial bandwidth becomes inversely proportional to the velocity of the moving object.

Since the video signal is sampled with spatial and temporal sampling frequencies, the sampled video signal is represented as 3-dimensional sampled data or pixels. Therefore, sampling of the continuous function $f_3(\cdot)$ may be expressed by multiplying the continuous function $f_3(x,y,t)$ with a 3-dimensional array of delta function. Spectrum distributions of the pixels are then given by the convolution of Fourier transform of $f_3(\cdot)$ and the delta function. As a result, the spectrum of the pixel is replicated at intervals of the sampling frequencies by the characteristics of the delta function. Therefore, from Eq. (2), it should be readily appreciated that spectrum aliasing between the repeated spectra occur in accordance with an increased velocity of moving object.

Figure 1A:
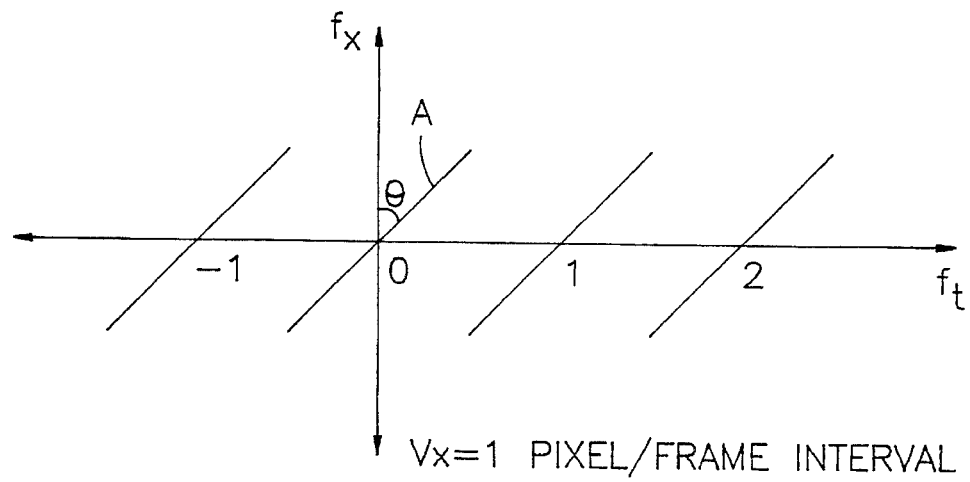
FIGS. 1*a*, 1*b* and 1*c* are diagrams illustrating base-band spectrum distributions as a function of a velocity of the moving object $v_x$=1 pixel/frame interval, $v_x$=2 pixels/frame interval and $v_x$=3 pixels/frame interval, respectively.
Figure 1B:
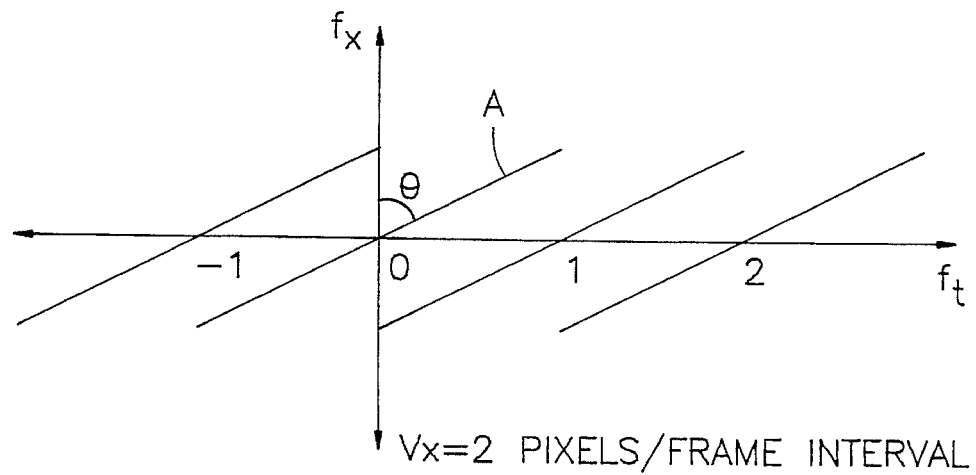
Figure 1C:
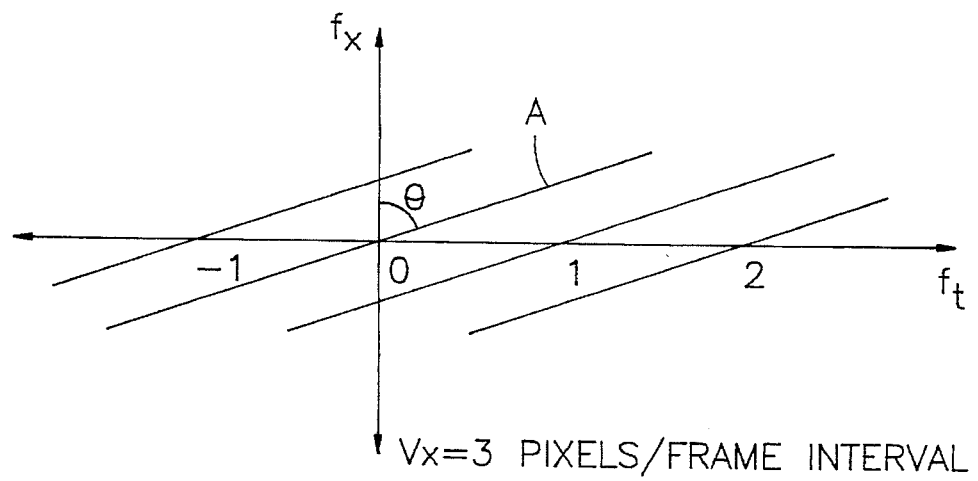

Referring first to FIGS. 1a, 1b and 1c, there are shown baseband spectrum distributions as a function of the velocity of the moving object $v_x$=1 pixel/frame interval, $v_x$=2 pixels/frame interval and $v_x$=3 pixels/ frame interval, wherein solid lines indicate the replicas of a baseband; and the temporal sampling frequency is normalized to 1; and the spatial (x axis direction) and temporal frequencies are designated $f_x$ and $f_t$.

The motion of the pixel A in the moving object causes the spectrum to become skewed from the spatial frequency axis fx as shown FIG. 1a. As shown in FIGS. 1a, 1b and 1c, the angle Θ of skew would increase as the velocity is increased. The reason for the skewing can be readily understood by considering the temporal frequency at a pixel in the video signal: as may be seen from Eq. (2), the distribution to the temporal frequency from a given spatial frequency is the product of the spatial frequency and the speed of the moving object, so higher velocity of the moving object give rise to higher temporal frequencies.

Consequently, As shown in FIGS. 1a, 1b and 1c, the aliasing appears when the velocity of the moving object is increased, wherein 1 pixel/unit time is a critical velocity not creating the aliasing. If the repeated spectra include the aliasing components, visual artifacts appear in image. Especially, this moving area composed of spatial high frequency components may distort psychovisual effects, i.e., the perceived velocity on moving areas may differ from the real velocity. For an efficient temporal band-limitation, therefore, it is desirable to design a temporal filter not affected by the aliasing.

Figure 2:
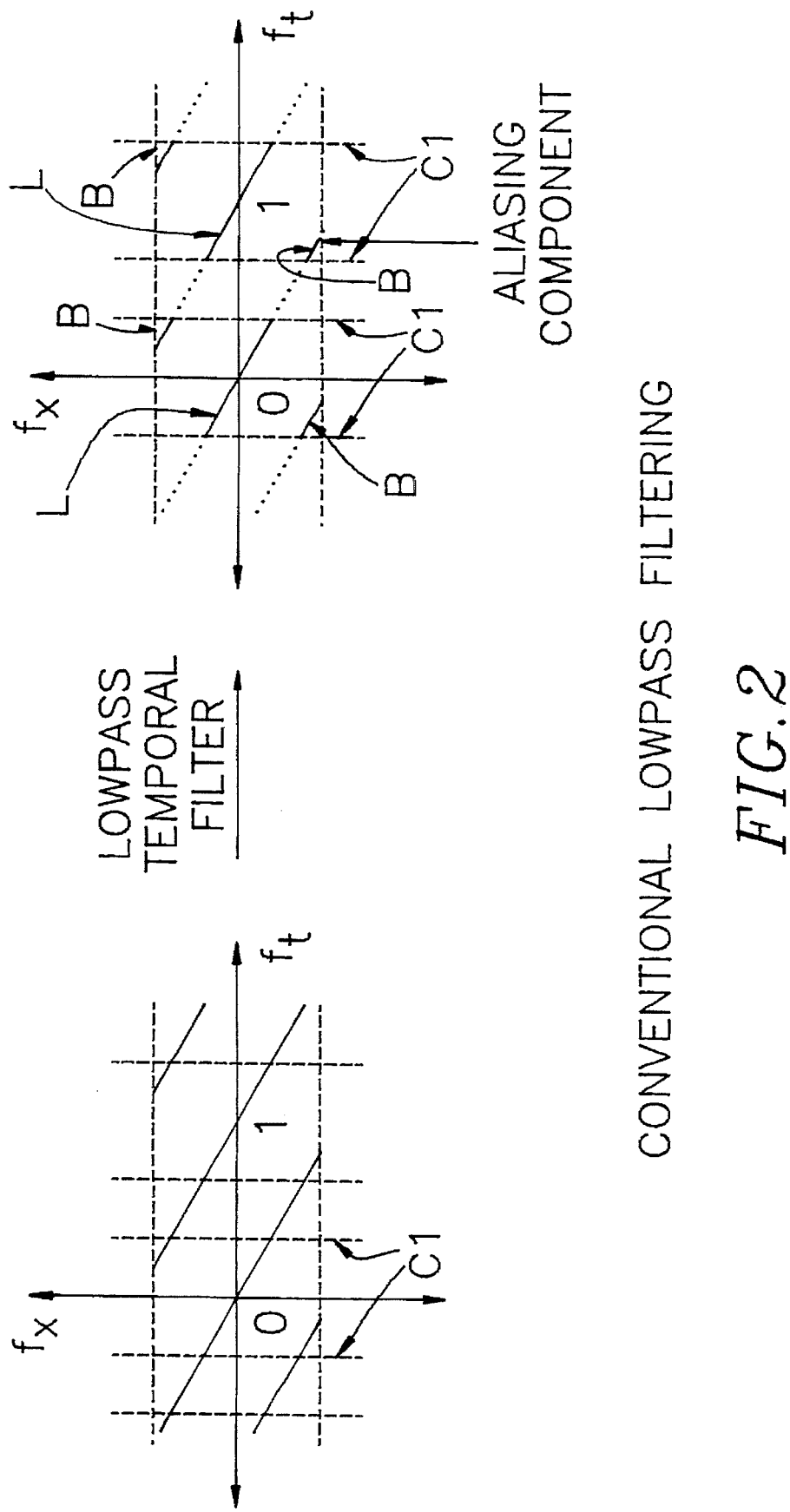
FIG. 2 is a diagram depicting the result of a conventional lowpass filtering in the temporal domain with a fixed temporal cutoff frequency.

Referring to FIG. 2, results of lowpass filtering on a temporal domain with a fixed temporal cutoff frequency C1 are illustrated. In order to perform the temporal filtering, two assumptions may be made as follows: first, baseband spectrum has no spatial aliasing components, and secondly, for simplicity, there exists only purely horizontal motion (x axis direction). In FIG. 2, filtered result contains spatial high frequency components B of adjacent spectra which is temporal aliasing. This is, the spatial high frequency components B affect the temporal low frequency ones L to the adjacent replicas. In other words, the display causes a disturbance between the spatial high frequency components B and the low frequency ones L of the adjacent replicas. Therefore, effects introduced by the aliasing should be reduced.

In accordance with the present invention, using the relationship between the location of the baseband spectrum and the velocity of the moving object, the temporal band-limitation can be achieved by spatial filtering, i.e., lowpass spatial filtering with its cutoff frequency corresponding to the temporal cutoff frequency C1. Thus, by means of Eq.(1) and (2), the relation between the spatial (including the vertical and the horizontal components) and temporal frequencies fv and ft are represented as follows:

$$f_v = \frac{1}{|V|} \cdot f_t \quad (3)$$

where the spatial frequency $f_v$ is specified on $f_x$-$f_y$ plane. As is seen from Eq. (3), it should be appreciated that, when the temporal frequency ft is fixed in order to limit temporal bandwidth, the spatial frequency is inversely proportional to the absolute value of the velocity of the moving object.

Assuming that h(·) be a lowpass impulse response including filter coefficients and, for simplicity, there exists only purely horizontal motion (x axis direction), then the temporal band-limited video signal g(x,t) is represented as follows:

$$g(x,t) = \int_{-\infty}^{\infty} h(\tau) \cdot f(x, t-\tau)d\tau \quad (4)$$

wherein a linear phase filter is used concerning the group-delay of a filter response. From the assumption of motion which has only constant-velocity rigid translational motion $V=(v_x, v_y)$ and purely horizontal motion (x axis direction).

$$f(x, t-\tau) = f(x-v_x\tau, t) \quad (5)$$

Thus, Eq. (4) is rewritten by $$g(x,t) = \int_{-\infty}^{\infty} h(\tau) \cdot f(x-v_x\tau, t)d\tau \quad (6)$$

And its Fourier transform is expressed by $$\begin{aligned}G(f_x,f_t) &= F\left\{\int_{-\infty}^{\infty} h(\tau) \cdot f(x-v_x\tau, t)d\tau\right\} \\ &= F\left\{\int_{-\infty}^{\infty} h\left(\frac{z}{v_x}\right) \cdot \frac{1}{|v_x|} \cdot f(x-z,t)dz\right\} \\ &= H(f_xv_x) \cdot F(f_x,f_t).\end{aligned} \quad (7)$$

Wherein F denotes a Fourier transform descriptor. As may be seen from Eqs. (9) and (7), although the filter impulse response H(·) has initially the predetermined temporal band-limiting characteristics, i.e., the temporal cutoff frequency, it varies in accordance with a conversion of the filtering domain. This is, the filter impulse response H(·) has the spatial band limiting characteristic, i.e., the spatial cutoff frequency corresponding to the predetermined temporal band-limiting characteristic i.e., the temporal cutoff frequency and the spatial cutoff frequency is changed in accordance with the velocity of the moving object to preserve the predetermined temporal-band limiting characteristic. Therefore, it should be appreciated that the motion adaptive spatial filtering is performed by a spatial filter implemented by Eq. (6).

Eq.(6) is a continuous description of the MASF. Similar results hold true in the discrete case: the integral is replaced by summation and $d\tau$ is represented by combination of $\Delta\tau$ and k. Eq.(6) is then given by $$g(x,n) = \sum_{k=-N}^{N} h(k\Delta\tau) \cdot f(x - v(x,n)\Delta\tau \cdot k, n) \quad (8)$$

wherein n is the number of frame; the velocity and filtering positions are replaced by vector form x and v; filter length is 2N+1(N is a positive integer ); and $\Delta\tau$ is selected to satisfy $|v(\cdot)\cdot\Delta\tau| \leq |\Delta x|$ (If $\Delta\tau$ is different from the required value, it may cause spatial aliasing).

Let $\Delta T$ be a frame to frame interval, $v(\cdot)\Delta T$ is then equal to D(·) which is a displacement between the current and the previous video frame signals. Then, $v(\cdot)\cdot\Delta\tau$ can be replaced by unit vector $\hat{D}(\cdot)$ of D(·), i.e., Eq. (8) can be modified as follows:

$$g(x,n) = \sum_{k=-N}^{N} h(k) \cdot f(x - \hat{D}(x,n) \cdot k, n) \quad (9)$$

wherein $\Delta\tau$ is normalized to 1, and h(·) is determined by Eqs.(2) and (3). Therefore, it should be known that Eq.(9) is an implementation of Eq.(6), and the filtering operation is performed on spatial domain along the trajectory of moving object and thereby achieving a temporal band limitation.

Further, the spatial displacement f(·) may be determined by the motion vector which represents the displacement of the moving object between the current video frame signal and the previous video frame signal.

Figure 3:
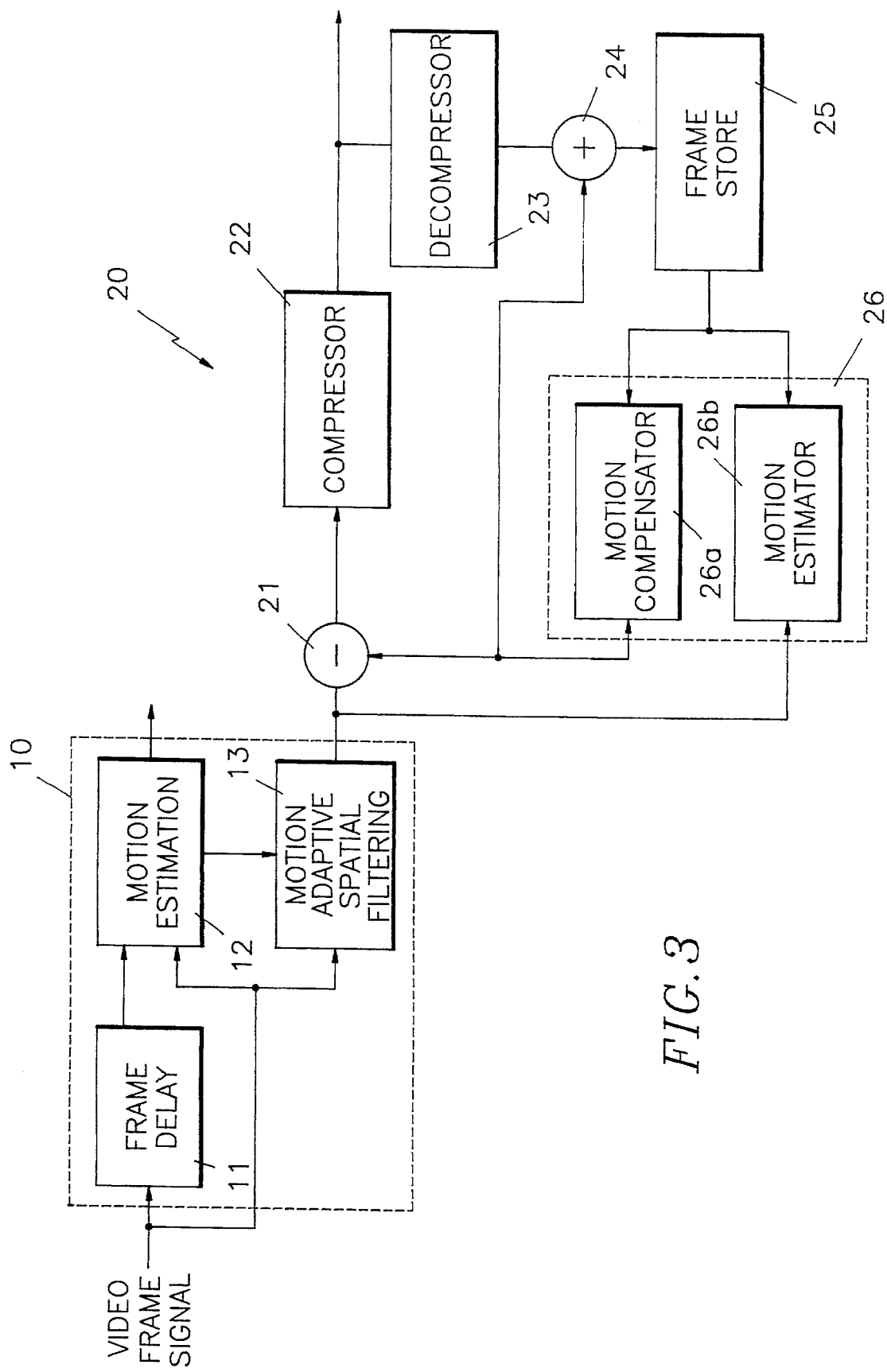
FIG. 3 is a schematic block diagram representing an image coding apparatus employing the motion adaptive spatial filtering method in accordance with a preferred embodiment of the present invention.

Referring now to FIG. 3, there is shown an image coding apparatus employing the motion adaptive spatial filtering method in accordance with a preferred embodiment of the present invention. The image coding apparatus comprises a motion adaptive spatial filter 10 for filtering video signals on spatial domain along the trajectory of the moving object, and an image encoder 20 for eliminate redundancy in the filtered video signals in order to compress these video signals to a more manageable size available for transmission. The video signals are generated from a video signal source, e.g., video camera(not shown).

The motion adaptive spatial filter 10 includes a frame delay block 11, a motion estimation block 12 and a motion adaptive spatial filtering block 13. The frame delay block 11 has a frame buffer memory in which a video frame signal is delayed by one frame interval. The delayed video frame signal is coupled to the motion estimation block 12 as a previous video frame signal.

The motion estimation block 12, as well known in the art, receives the previous video frame signal and a current video frame signal directly coupled from the video source, which determines moving objects in the current video frame signal and extract motion vector associated with each of pixels consisting of the moving object. The extracted motion vector are sequentially coupled to the motion adaptive spatial filtering block 13. In order to extract the motion vector associated with each of pixels, various motion estimator well known in the art may be employed and, more specifically, the motion estimator disclosed in the article published by Simulation Model Educational Group, MPEG (Moving Picture Experts Group) Video Simulation Model Three(SM3), ISO/IEC JTC1/SC2/WG11, MPEG 90/041 (July 1990) may be advantageously utilized.

The MASF block 13 receives the current video frame signal and the extracted motion vector, which serves to filter the current frame signal along the trajectory of the moving object, as detailed disclosed hereinbefore. The MASF block 13 includes a lookup table which a plurality of filter coefficients corresponding to predicted motion vectors. In the video frame signal, the displacements of the predicted motion vectors are, for example, in the range of ±6 pixels/frame interval. The filtered current frame signal is then coupled to the image encoder 20.

The image encoder 20 receives the filtered current video frame signal, which serves to eliminate redundancy in the video frame signals in order to compress these frame signals to a more manageable size available for transmission. The image encoder 20, in accordance with a preferred embodiment of the present invention, includes a differential pulse code modulation(DPCM) block which has a compressor 22, a decompressor 23 and a motion compensation block 26. The compressor 22, as is well known in the ark, employs a Discrete Cosine Transform ("DCT") circuit and a quantization circuit which are described in an article by Chan and Pratt, "Scene Adaptive Coder", *IEEE Transactions on Communications*, Vol. COM-32, No.3 (March 1984), while the decompressor 23 employs an inverse quantization circuit and an inverse DCT circuit. The motion compensation block is conventional component used to predict a current video frame signal from a previous video frame signal.

The predicted video frame signal is subtracted through the use of a motion compensation block and then coupled to a subtraction circuit 21 which generate a differential signal between the filtered current video frame signal and the predicted video frame signal. The differential signal is quantized and encoded by the compressor 22 to digital data. The digital data is then transmitted via a transmission medium to receiver(not shown), and also coupled to the decompressor 23 where the digital data is converted back to the differential signal. The differential signal is then coupled to a adder circuit 24 where it is combined to the predicted video signal and converted back to a video frame signal identical to the current video frame signal. The video frame signal as a previous video frame signal is coupled through a frame store block 26 to the motion compensation block 26 to predict the video frame signal for subsequent video frame signal. Therefore, the bit rate reduction is achieved by taking advantage of the fact that the differential signals are generally distributed over a small dynamic range and consequently can be represented by a smaller number of bits.

The motion compensation block 26 includes a motion compensator 26a and a motion estimator 26b for predicting the current video frame signal from the previous video frame signal. The motion estimator 26b employs a block matching algorithm which is based on a block by block processing disclosed in the MPEG Video Simulation Model Three(SM3). In order to reduce the computational requirements in the block matching algorithm, a three step search method, as is well known in the art, is advantageously employed (see, for example, *Two-Dimensional Signal and Image Processing*, Prentice-Hall, International Edition, pp 497–500(1990)) is advantageously utilized. In the block matching algorithm, a small block called a search block is taken from the current video frame signal and a larger block called a search block is taken from the previous video frame signal, wherein the current video frame signal is divided into a plurality of search blocks of an equal size and the previous video frame signal is also divided into a corresponding number of the search regions. In the three step search method, a predetermined initial vector may be utilized to determine a location and a size of the search region. Search block displacement information, indicative of the location of a block in the search region that best matches a search block, is determined by motion estimator which inputs corresponding motion vector to the motion compensator. The motion compensator receives the motion vectors to displace the previous video frame signal in such a way that it more closely resembles the current video frame signal. As is described above, the displaced video frame signal, i.e., the predicted video frame signal is then coupled to the subtraction circuit in order to extract the differential signal.

Figure 4:
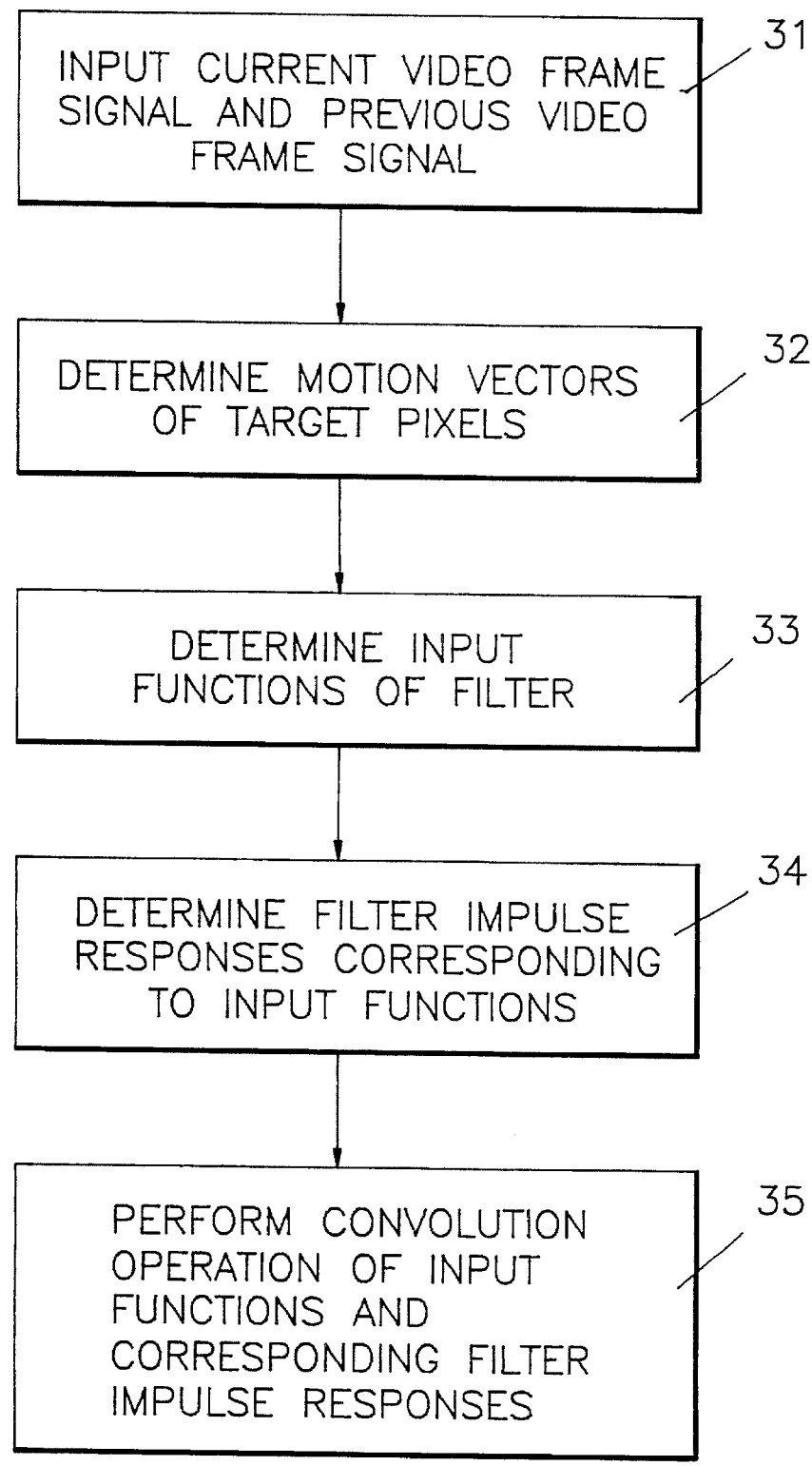
FIG. 4 is a flow chart explaining the motion adaptive spatial filtering method performed at the motion adaptive spatial filter shown in FIG. 3.

Referring to FIG. 4, there is shown a flow chart for illustrating the motion adaptive spatial filtering method performed at the motion adaptive spatial filter 10 shown in FIG. 3. In step 31, the current video frame signal and its previous video frame signal are initially coupled to the motion estimation block 12 shown in FIG. 1. The video frame signal includes a plurality of moving objects which have relatively high speed.

In step 32, the moving objects are estimated and the motion vectors of the target pixels consisting of the respective moving object are determined. The motion vector, as is described hereinbefore, reflect the moving direction and the velocity components of the target pixel. The determined motion vectors are sequentially coupled to the motion adaptive spatial filtering block 13 shown in FIG. 1.

In step 33, the input functions for target pixels are determined. Each of the input function includes a group of pixels. The group of pixels includes a plurality of pixels located on the trajectory of the target pixel to be filtered. The trajectory of the target pixel contained in the moving object is determined the through the use of its motion vector.

In step 34, the filter impulse responses are determined by the motion vectors. The filter impulse responses serve to limit the bandwidth of the video frame signal to a predetermined bandwidth. Each of the filter impulse response includes a group the filter coefficients which are pre-calculated in accordance with the predicted motion vectors and preferably stored in the lookup table as described in FIG.3. Therefore, the determination of the filter impulse response is achieved by selecting a group of the filter coefficients corresponding to the motion vectors.

In step 35, The convolution operation through the use of the input functions and the corresponding filter impulse response is performed as represented by Eq (9) in order to achieve the band-limitation of the video frame signal without the temporal aliasing. In connection with the steps 33, 34 and 35, These steps may be sequentially performed for the individual target pixel.

Figure 5:
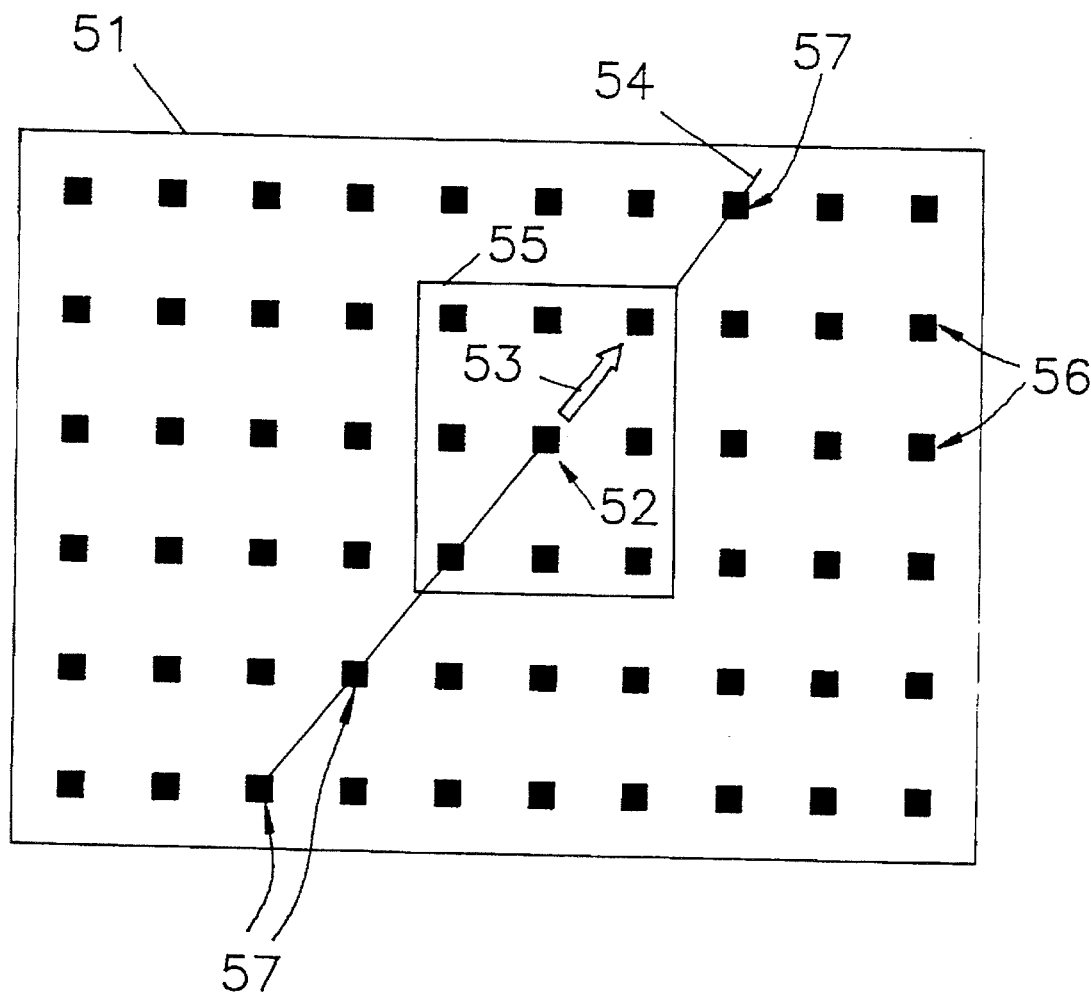
FIG. 5 is an explanatory diagram illustrating the motion adaptive spatial filtering shown in FIG. 4.

Referring to FIG.5, There is shown an explanatory diagram illustrating the motion adaptive spatial filtering shown in FIG. 4. The video frame signal 51, as is well known in the art, includes a plurality of the pixels 56 which are arranged in a rectangular sampling pattern and shown as rectangular dots. For the target pixel 52 in the moving object 55, a filtering input function is selected as a group of the pixels 57 which are located on the movement trajectory 54 of the target pixel 52. The trajectory 54 of the target pixel 52, as described herein before, is determined through the use of the motion vector 53 of the target pixel 52. Thus, the motion adaptive spatial filtering is performed through the use of the input function and the corresponding filter impulse response determined in the step 34 shown in FIG. 4. This filtering operation is continued until all target pixels in the moving objects is filtered. Consequently, as described above, it should be known that the motion adaptive spatial filtering is performed in the spatial domain along the trajectory of the moving object so that the spatial band limitation is obtained by the spatial cutoff frequency which changes adaptively with the motion vector.

Referring now to FIG. 6, there is shown result of the lowpass temporal filtering on a spatial domain through the use of the motion adaptive spatial filtering method. Although the filtering operation is performed with the spatial cutoff frequency C2 adaptive to the motion vector, the temporal band limitation by the temporal cutoff frequency C1, as shown in FIG. 5, can be achieved. Comparing with the temporal band-limitation using temporal domain pixels of FIG. 2, it should be readily appreciated that the spatial band-limitation is not affected by temporal aliasing components(de-aliasing characteristics).

As may be seen from the Eq (9) and FIG. 4, it should be appreciated that the filtering operation is performed on spatial domain along trajectory of moving objects to thereby achieve a temporal band limitation. Therefore, the temporal aliasing occurring in the repeated spectra when the velocity of the moving objects is increased, may be effectively eliminated by the filter to thereby greatly reduce the visual artifacts appear in the moving areas in image.

While the present invention has been shown and describe with reference to the particular embodiments, it will be apparent to those killed in art that many changes and modifications may be made without departing from the spirit and scope of the invention as defined in the appended claims.

What is claimed is:

1. A method for filtering a video frame signal with a predetermined temporal cutoff frequency to achieve a temporal band limitation in an image coding apparatus having a filter and an encoder for eliminating redundancy in the filtered video frame signal in order to compress the video frame signal to a manageable size for the transmission thereof, wherein the video frame signal has one or more object moving in a high velocity, which comprises the steps of:

(a) determining a motion vector which represents the movement of the moving object between a current video frame signal and its previous video frame signal; and (b) performing a filtering operation of the video frame signal in the spatial domain with a spatial cutoff frequency which changes adaptively with the determined motion vector in order to achieve the temporal band limitation, wherein the motion vector includes a velocity component and a direction component, and the spatial cutoff frequency $f_v$ is represented as follows:

$$f_v = \frac{1}{|V|} \cdot f_t$$

wherein ft is the predetermined temporal cutoff frequency; and V is the velocity component.

2. The method of claim 1, wherein the filtered video frame signal g(x,n) is represented as follows:

$$g(x,n) = \sum_{k=-N}^{N} h(k) \cdot f(x - \hat{D}(x,n) \cdot k, n)$$

wherein v, x are the vectors representing the velocity and the filtering position, respectively; n is the number of the video frame signal; h(·) is filter impulse response; k is filter length; N is positive integer; and $\hat{D}(\cdot)$ is a unit vector of D(·) which is a displacement between the current and the previous video frame signal.

3. The method of claim 2, wherein each of the moving objects including a plurality of the target pixels; the step(a) includes the determining the motion vector which represents the movement of each of the target pixels consisting of each of the moving objects between a current video frame signal and its previous video frame signal; and wherein the step(b) includes the steps:

(c) determining, as an input signal function, a group of pixels located on the trajectory of the target pixel through the use of the motion vector;

(d) determining a filter impulse response for limiting the bandwidth of the video frame signal to a predetermined temporal bandwidth in accordance with the motion vector; and (e) performing a convolution of the input function and the corresponding impulse response in order to obtain the filtered video frame signals which has the predetermined temporal bandwidth without the temporal aliasing.

4. The method of claim 3, wherein the filter impulse response include a group of filter coefficients predetermined by a predicted motion vector, which is in the range of ±6 pixels/frame interval, and selected by the motion vector.

5. The method of claim 4, wherein the velocity of the moving object is greater than 1 pixel/frame interval.

* * * * *